United States Patent [19]

Pollack

[11] 4,454,374

[45] Jun. 12, 1984

[54] ELECTRIC CORD HOLDER AND COVER

[76] Inventor: Ronald M. Pollack, 73-19 37th Rd., Jackson Heights, N.Y. 11372

[21] Appl. No.: 443,037

[22] Filed: Nov. 19, 1982

Related U.S. Application Data

[63] Continuation-in-part of Ser. No. 323,651, Nov. 20, 1981, abandoned.

[51] Int. Cl.³ .............................................. H02G 3/04
[52] U.S. Cl. .............................. 174/68 C; 174/117 A
[58] Field of Search ..................... 174/48, 68 C, 70 C, 174/72 C, 95, 97, 117 A; 52/220, 221, 287, 288

[56] References Cited

U.S. PATENT DOCUMENTS

| | | | |
|---|---|---|---|
| 3,118,017 | 1/1964 | Wimbish | 174/97 |
| 3,240,456 | 3/1966 | Hartman | 174/97 |
| 3,499,102 | 3/1970 | Gillemot et al. | 174/138 F |
| 4,049,905 | 9/1977 | Maranell | 174/163 F |

FOREIGN PATENT DOCUMENTS

| | | | |
|---|---|---|---|
| 2103715 | 8/1972 | Fed. Rep. of Germany | 52/287 |
| 1135514 | 12/1956 | France | 174/97 |
| 1161556 | 3/1958 | France | 174/117 A |
| 1236656 | 6/1960 | France | 174/97 |
| 1329006 | 4/1963 | France | 174/68 C |
| 966921 | 8/1964 | United Kingdom | 174/48 |
| 1420216 | 1/1976 | United Kingdom | 174/68 C |

Primary Examiner—Laramie E. Askin
Attorney, Agent, or Firm—Collard, Roe & Galgano

[57] ABSTRACT

Electrical wiring forming the cords of domestic appliances such as clocks and lamps is unsightly and generally hangs or runs loosely from the appliances to the electrical outlets in a room. In order to hide such wiring and maintain it in an orderly condition, an electric cord holder and cover has been devised. The electric cord holder and cover includes an elongated plastic extrusion of tubular shape which is a cross-section in the form of a substantially C-shaped front portion and an overhang, and a rear portion extending inwardly from one end of the C-shaped portion towards the other end of the C-shaped portion, yet leaving a slot adapted for insertion of electrical wiring between the inwardly extending rear portion and the other end of said C-shaped portion, and a securing strip of predetermined width which defines an outer surface. The securing strip is connected to the rear portion and is adapted to be attached to an external surface. The overhang extends outwardly up to the outer surface, so as to be flush therewith. The electric cord holder and cover may then be attached to an external surface with the overhang abutting the external surface.

19 Claims, 9 Drawing Figures

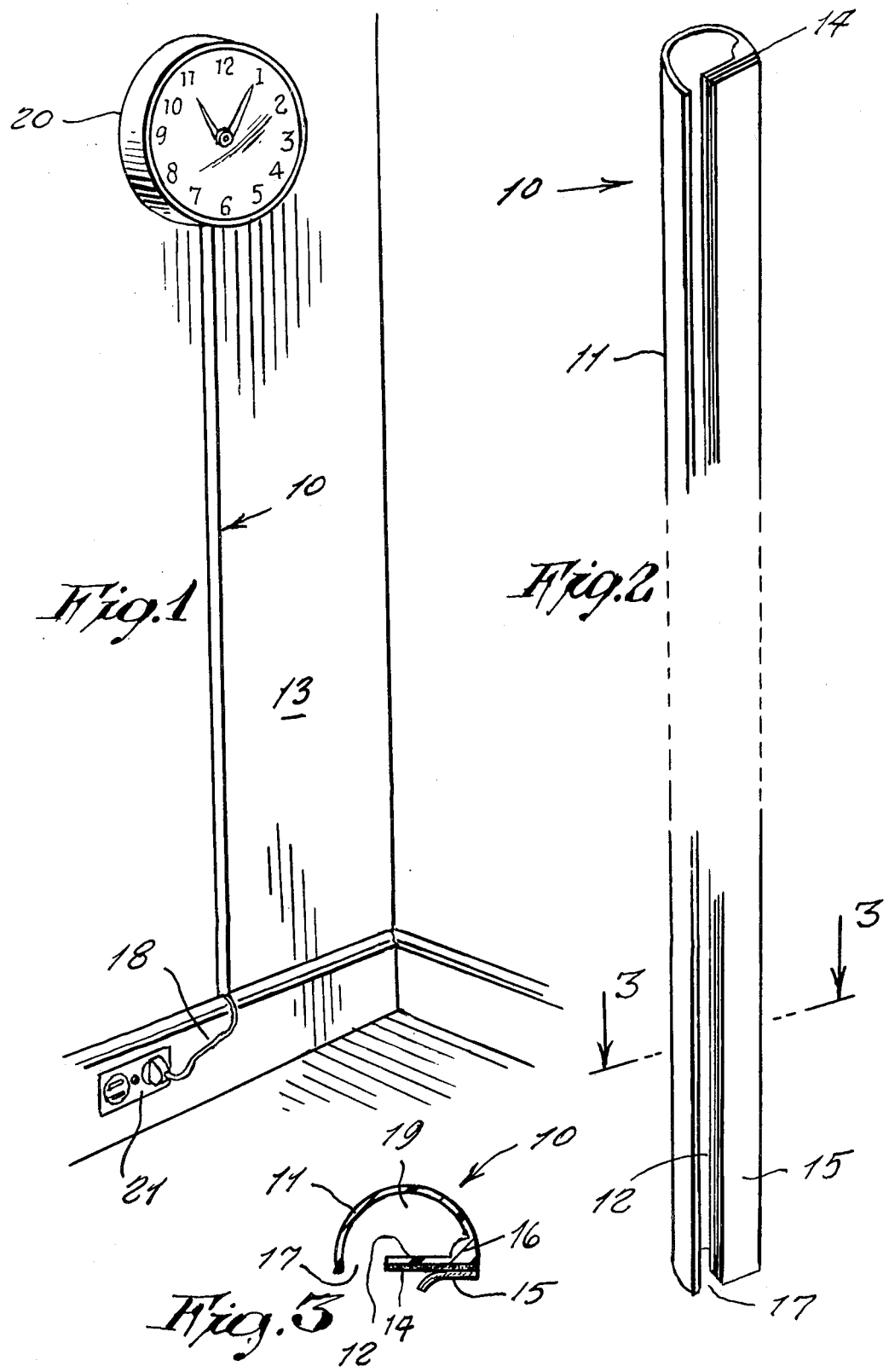

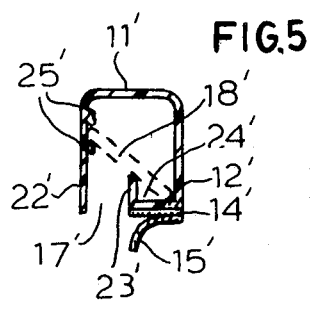
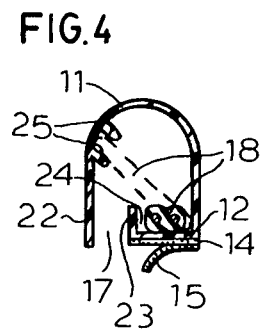
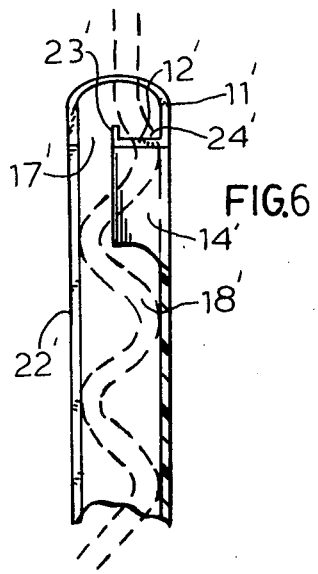
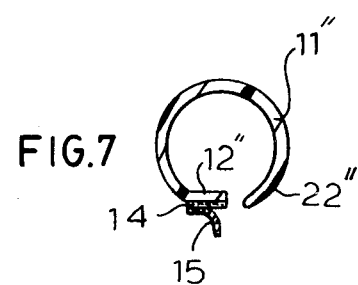
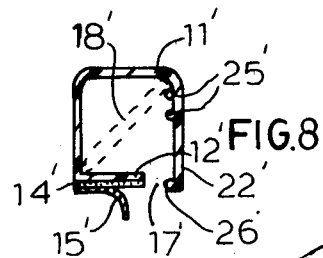
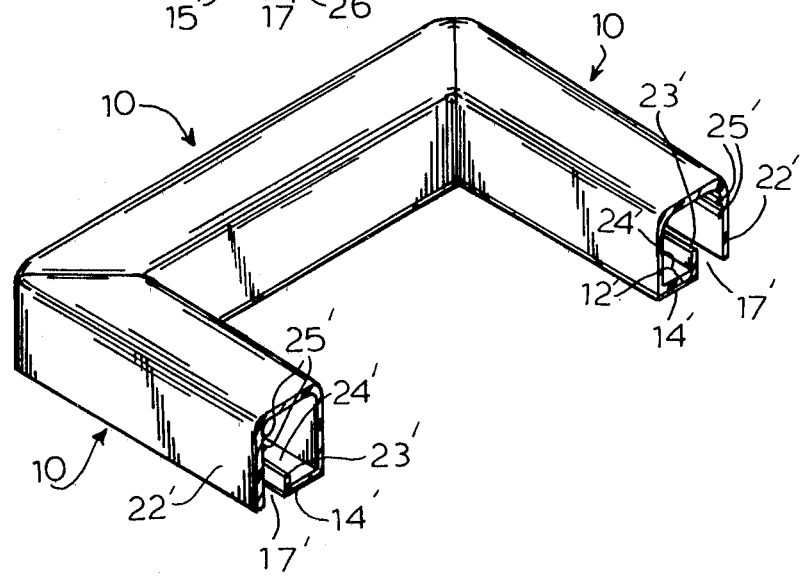

ELECTRIC CORD HOLDER AND COVER

REFERENCES TO OTHER APPLICATIONS

This is a continuation-in-part of application Ser. No. 323,651, filed Nov. 20, 1981, now abandoned.

FIELD OF THE INVENTION

This invention relates to an electric cord holder for hiding electrical wiring.

BACKGROUND OF THE INVENTION

From French Pat. No. 1,161,556 there is known an electric cord holder which, as seen in cross-section, is substantially O-shaped, or B-shaped, and includes flanges extending outwardly along a corresponding longitudinal portion of the O-shaped or B-shaped cross-section. An adhesive strip is mounted on the flanges, and is provided with a protective covering which is stripped off prior to the intended use of the cord holder. In order to form the electric cord holder, according to the French patent, the cord holder is preferably created by surrounding a pair of electric wires initially with a protective sheet, as no provision exists to slide a pair of wires into the cord holder along a longitudinal slit. Also the outwardly extending flanges require an excessive amount of space, which is disadvantageous in some applications.

From British Pat. No. 966,921, issued to Andersson, there is known a casing in the form of a clam-shell molding, for example, for electrical cables, which, as seen in cross-section, is substantially J-shaped, or has a substantially J-shaped contour; it includes in some versions a portion extending at right angles from the top-most cross-leg of the J-shaped cross-section on an inner side thereof towards the arcuate portion of the J-shaped cross-section. This relatively large-dimensioned configuration is suitable for installation, for example, along a floor, where the floor meets an upstanding wall, as sharp edges are avoided thereby. But is has disadvantages when used free-standing, because it inconveniently exposes its sharp edges, thereby possibly causing injuries when a person inadvertently brushes against those sharp edges.

SUMMARY OF THE INVENTION

It is accordingly an object of the present invention to obviate the disadvantages of the prior art. This object is attained by providing an electric cord holder which has a cross-section in the form of a substantially C-shaped front portion which has an overhang, and a rear portion extending inwardly from one end of the C-shaped portion towards the other end of the C-shaped portion, yet leaving a slot adapted for insertion of electrical wiring between the inwardly extending portion and the other end of the C-shaped portion. Securing means of predetermined width, which define an outer surface, are connected to the rear portion, and are adapted to be attached to an external surface so as to support the electric cord holder on the external surface; the overhang extends outwardly up to the outer surface so as to be flush therewith, so that the electric cord holder may be attached to the external surface with the overhang abutting the external surface.

Certain of the foregoing and related objects are also attained in an electric cord holder, which includes a sheath made of an elongated plastic extrusion having a slotted-tubular cross-section so as to define a cord-receiving channel therein. The sheath has a dome-shaped front wall having two ends and a planar rear wall joined to one end of the front wall and extending from the one end of the front wall towards the other end of the front wall. The rear wall has a free end leaving a slot adapted for insertion of an electrical cord into the cord-receiving channel between the free end of the rear wall and the other end of the front wall. The rear wall has an inner face which partially defines the cord-receiving channel and an outer face. The front wall has an overhang depending from the other end thereof which extends beyond the outer face and at least slightly toward the free end of the rear wall. The holder further includes securing means of predetermined width having a generally planar outer surface connected to the outer face of the rear wall and adapted to be attached to an external surface, whereby the electric cord holder may be attached to the external surface with the overhang substantially abutting the external surface.

In a further embodiment of the invention, the electric cord holder includes a sheath made of an elongated plastic extrusion having a slotted-tubular cross-section so as to define a cord-receiving channel therein. The sheath has a dome-shaped front wall having two ends and a planar rear wall joined to one end of a the front wall and extending from the one end of the front wall towards the other end of the front wall. The rear wall has a free end leaving a slot adapted for insertion of an electrical cord into the cord-receiving channel between the free end of the rear wall and the other end of the front wall, and it also has an inner face which partially defines the cord-receiving channel and an outer face. The dome-shaped front wall includes two radially-inwardly extending ribs spaced apart from one another so as to form a groove therebetween, whereby the electrical cord may be nestled between the groove and the rear wall. The holder also includes securing means of predetermined width having a generally planar outer surface connected to the outer face of the rear wall and adapted to be attached to an external surface, whereby the electric cord holder may be attached to the external surface.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purposes of illustration only, and not as a definition of the limits of the invention.

In the drawings, wherein similar reference characters denote similar elements throughout the several views:

FIG. 1 is a perspective view of the invention shown installed on a room wall, so as to enclose an electric wire to a clock;

FIG. 2 is a large-scale fragmentary perspective view of the electric cord holder, according to the invention;

FIG. 3 is another large-scale cross-sectional view taken alone line 3—3 of FIG. 2, showing the protective cover being peeled off the adhesive back strip, so that the electric cord holder can be attached to a surface, such as a wall;

FIG. 4 is a cross sectional view of the electric cord holder, according to the present invention, shown an arcuate version of the electric cord holder, and how the electric wiring can be nestled either in a trough formed in the cord holder, or be disposed between two longitudinal ribs and the trough;

FIG. 5 corresponds to FIG. 4, but shows a substantially rectangular version of the cord holder with rounded edges;

FIG. 6 is a fragmentary longitudinal cross-section of the electric cord holder, according to the present invention, showing how the electric wiring can be accommodated in the electric cord holder in snaked form;

FIG. 7 is a cross sectional view of another version of the cord holder, according to the present invention, which is formed in the shape of an arc subtending an angle of about 270°;

FIG. 8 is a cross sectional view of a further version of the cord holder, according to the present invention, formed with an inwardly projecting bulge near one longitudinal side of the cord holder, which is made of resilient material, and faces a rear portion of the cord holder, so that the electric wiring can be inserted into the cord holder, with the resilient longitudinal side being at first spread outwardly, and then snapping back to its initial position so as to securely contain the electrical wiring in the cord holder; and FIG. 9 is a perspective view of another version of the electric cord holder, according to the present invention, showing how two or more cord holders, each having an end part sloping at an angle of about 45° with respect to its longitudinal axis, can be joined together along these parts approximately at right angles.

DESCRIPTION OF THE PREFERRED EMBODIMENTS

Referring now to the drawings, and in particular to FIGS. 1–3, an electric cord holder 10 includes an elongated sheath made from an extruded plastic material, so as to be inexpensive to manufacture, and so that it can be formed in any of various attractive shapes to harmonize with the room decor. The plastic material is preferably semi-soft, so that it may be easily cut to any desired length by a knife or a hack saw.

Generally this sheath has a slotted tubular cross-section so as to define a cord-receiving channel therein. The sheath includes a front wall 11 visible for viewing, which is generally dome-shaped or C-shaped in cross-section, and which encloses the electric wiring, so that it is not visible from either the front, or the sides of the electric cord holder. The C-shaped cross-section of the electric cord holder, according to the present invention, may be arcuate, subtending an angle from about 180° to about 270°, as shown, for example, in FIG. 7, or may have in part a substantially semi-circular cross-section, as shown, for example, in FIG. 4, or may have a substantially rectangular cross-section with rounded corners, as shown, for example, in FIG. 5. It may, alternatively, be otherwise shaped, for example being fluted, so as to suitably blend in with the room decor and resemble a decorative molding.

The sheath also includes a flat rear portion or rear wall 12, for being attached to an external surface, such as a wall 13 of a room. A rear side or outer face of the rear portion or rear wall 12 is coated or provided with pressure sensitive securing means, such as an adhesive strip 14, as shown, for attachment to the wall 13, after a protective cover 15 is first peeled off from the adhesive strip 14. Alternately, loop pile fastener means may be used, particularly when mounted on a fabric-covered wall, so that the loop pile provided on the rear of the electric cord holder 10 adheres thereto.

A longitudinal strengthening gusset 16 is preferably provided in one corner, namely near one end of the cross-sectionally C-shaped front or front portion 11, and the rear wall or rear portion 12 of the electric cord holder 10, and is integral with these portions.

An elongated slot 17 is formed between the free end of rear wall 12 and one end of the cross-sectionally C-shaped front wall 11, in order to allow insertion of the electrical wiring 18 therethrough, and into a cord-receiving channel 19 of the electric cord holder 10. The slot 17 can be formed either along one side edge of the rear wall 12, or else along the center thereof. It is, however, preferable to employ a configuration where the slot 17 is formed along one side edge of the rear wall 12, as it is then possible to lift the other, generally resilient side edge, to slide any particularly bulky wiring through the slot 17. In either case a single protective cover or release strip 15, such as paper, could be used for protecting the adhesive strip 14.

In operative use, once the wiring 18 is tucked through the slot 17 into the electric holder 10, the rear wall 12 acts to hold the wiring 18 in place, so that the electric cord holder 10 can be more easily attached to a baseboard, wall, ceiling or the like. In the illustrative example, the electric cord holder 10 encloses the wiring 18 between a wall-mounted electric clock 20 and a house electric socket 21.

As particularly seen in FIGS. 4, 5, 7 and 8, an overhang 22 or 22' extends from one end of the front wall or front portion 11, 11' or 11" rearwardly up to an outer surface of the adhesive strip 14 or 14', attached to the rear wall 12, 12' or 12", so as to be flush therewith the adhesive strip being, in turn, secured to a release strip 15 or 15'. Thus the electric cord holder 10 may be attached to the external surface or wall 13 with the overhang 22, 22' or 22" abutting the wall 13. Consequently, the cord holder 10 can be attached to a wall or the like without leaving any spaces between itself and the wall.

In a preferred form of the invention, another portion 23 or 23', as seen in cross-section of the electric cord holder 10, and as best seen in FIGS. 4 and 5, extends interiorly towards the front wall 11 or 11' so as to leave the slot 17 or 17' between the overhang 22 or 22' and the portion 23 or 23', but forming with the rear wall 12 or 12' a trough 24 or 24', in which the electric wiring 18 or 18' can be nestled.

Alternately, or additionally, two radially inwardly extending ribs 25 or 25' can be provided on the interior of the front wall 11 or 11', so that the electric wiring 18 or 18' can be alternately nestled between the ribs 25 or 25' or on one side of the ribs 25 or 25', on one hand, and the aforedescribed trough 24 or 24', on the other hand.

It is especially advantageous if the cross-sectionally C-shaped front wall 11' is provided with an inwardly projecting longitudinal bulge 26 facing the rear wall or rear portion 12', as best seen in FIG. 8, and if the leg of the front wall 11', on which the bulge 26 is formed, is made of resilient material. In this manner the wiring 18' can be inserted through the slot 17' into the electric cord holder 10, thereby forcing the bulge 26 outwardly; as soon as the wiring 18' is, however, contained in the electric cord holder 10, the bulge 26 snaps back, thus securely enclosing and protecting the electric wiring 18'.

In order to permit two electric cord holders 10 to be jointed at right angles, it is advantageous to form an end part of the electric cord holder so that it slopes at an angle of about 45° with respect to its longitudinal axis.

This is best seen in FIG. 9, which show three electric cord holders 10 to be joined to one another so as to form a U-shaped configuration. But the ends of the cord holders can also be shaped so that one cord holder can extend, for example, along an upright wall, and the other cord holder to be joined thereto at right angles can extend, for example, along the ceiling.

If the electric wiring 18 or 18' is inserted in snaked form into the electric cord holder 10, as shown, for example, in FIG. 6, sufficient rigidity is provided so as to enable the electric wiring 18 or 18' to abut the interior surfaces of the cord holder 10. This advantageous configuration permits the cord holder 10, for example, to be free standing without the risk of the electric wiring 18 or 18' sliding within the cord holder 10. It will be understood, however, that the wiring 18 or 18' may also be arranged to slide within the electric cord holder 10, if it is of a width or diameter smaller than the internal bore of the electric cord holder 10, and this may be advantageous in some applications, where the wiring has to be adjusted prior to final installation. It will be also understood that the wiring 18 or 18' may alternately be inserted into the electric cord holder 10 from one end thereof; this form of insertion may be useful and desirable where the cord holder 10 is already attached to a wall, and it is not desired to remove the cord holder 10 from the wall before inserting the electric wiring 18 or 18' through the slot 17 or 17'.

In a preferred version of the invention, the width of the slot is about ¼". It will be appreciated that the electric cord holder, according to the present invention, can be affixed not only to a wall, but to a ceiling or to a baseboard. It can be arranged to be self-supporting, or where it is required to be attached to a wall or the like, such attachment can be performed manually without the use of any tools of any kind. It can generally be form-fitted to the surroundings, and will be found to be quite unobtrusive.

It should also be pointed out that the inwardly curved end 22" of the C-shaped front wall 11", shown in FIG. 7, as well as the inwardly curved bulge 26 shown in FIG. 8, serve to retain the snaked-in wire 18', shown in FIG. 6. When the wire is inserted into the electrical cord holder 10 in a snaked-in fashion, either the bulge or the inwardly curved end acts to hold the wire in the holder.

From an esthetic point of view, since the electric cord holder 10 may be made of various colors and finishes, to the user's eye it becomes part of the decor of the room, or of the lamp or clock to which it is connected, and the fact that it is indeed used to hide electric wiring is forgotten.

While only a few embodiments of the present invention have been shown and described, it is obvious that many changes and modifications may be made thereunto. In particular, specific features of one version of the invention can be combined with specific other features of another embodiment of the invention without departing from the spirit and scope of the invention.

What is claimed is:

1. An electric cord holder, comprising:
    a sheath made of an elongated plastic extrusion having a slotted-tubular cross-section so as to define a cord-receiving channel therein, said sheath having a dome-shaped front wall having two ends and a planar rear wall joined to one end of said front wall and extending from said one end of said front wall towards the other end of said front wall, said rear wall having a free end leaving a slot adapted for insertion of an electrical cord into said cord-receiving channel between said free end of said rear wall and said other end of said front wall, said rear wall having an inner face which partially defines said cord-receiving channel and an outer face, said front wall also having an overhang depending from said other end thereof which extends beyond said outer face and at least slightly toward said free end of said rear wall; and
    securing means of predetermined width having a generally planar outer surface connected to said outer face of said rear wall and adapted to be attached to an external surface, whereby said electric cord holder may be attached to said external surface with said overhang substantially abutting said external surface.

2. The electric cord holder as claimed in claim 1, wherein said sheath includes a wall portion extending from said free end of said rear wall radially inwardly towards said dome-shaped front wall, yet leaving a gap between said wall portion and said dome-shaped front wall so that said rear wall and said wall portion together with said dome-shaped front wall form a longitudinally-extending trough in which electrical cord can be nestled.

3. The electric cord holder as claimed in claim 1, wherein said securing means comprises an adhesive strip and a protective cover normally covering said adhesive strip, but removable therefrom prior to attachment of said electric cord holder to said external surface.

4. The electric cord holder as claimed in claim 1, wherein at least a part of said dome-shaped front wall is substantially semicircular.

5. The electric cord holder as claimed in claim 1, wherein said dome-shaped front wall is arcuate and forms an arc extending over an angular range between 180° and 270°.

6. The electric cord holder as claimed in claim 1, wherein said dome-shaped front wall includes two substantially parallel wall portions and a connecting wall portion extending substantially parallel with said rear wall, and forming respective rounded junctions with ends of said parallel wall portions.

7. The electric cord holder as claimed in claim 1, wherein said overhang includes an inwardly projecting longitudinal bulge facing said free end of said rear wall so as to define said slot between said free end of said rear wall and said longitudinal bulge.

8. The electric cord holder as claimed in claim 1, wherein said dome-shaped front wall includes two radially inwardly extending ribs spaced apart from one another so as to form a groove therebetween, whereby electrical cord may be nestled between said groove and said rear wall.

9. The electric cord holder as claimed in claim 1, further comprising a longitudinal strengthening gusset disposed between said one end of said dome-shaped front wall and said rear wall, and integral with said walls.

10. The electric cord holder as claimed in claim 1, wherein said sheath of elongated plastic extrusion defines a longitudinal axis and has an end part sloping at an angle of about 45° with respect to said longitudinal axis, whereby another sheath of elongated plastic extrusion similar to said sheath of plastic extrusion can be joined to said sheath of plastic extrusion along said end parts approximately at right angles.

11. The electric cord holder as claimed in claim 1, wherein said slot has a width of about ¼ of an inch.

12. The electric cord holder as claimed in claim 1, wherein said securing means includes an adhesive strip.

13. The electric cord holder as claimed in claim 1, wherein said securing means includes loop pile fastener means.

14. An electric cord holder, comprising:
an elongated plastic extrusion of tubular shape having a cross-section in the form of a substantially C-shaped front portion having an overhang, and a rear portion extending inwardly from one end of said C-shaped portion, yet leaving a slot adapted for insertion of electrical wiring between said inwardly extending rear portion and the other end of said C-shaped portion, said C-shaped portion including two radially inwardly extending ribs spaced apart from one another so as to form a groove therebetween, whereby electrical wiring may be nestled between said groove and said inwardly extending rear portion; and
securing means of predetermined width defining an outer surface, said securing means being connected to said rear portion and adapted to be attached to an external surface, said overhang extending outwardly up to said outer surface so as to be flush therewith, whereby said electric cord holder may be attached to said external surface with said overhang abutting said external surface.

15. The electric cord holder as claimed in claim 14, wherein said securing means comprises an adhesive strip and a protective cover normally covering said adhesive strip, but removable therefrom prior to attachment of said electric cord holder to said external surface.

16. The electric cord holder as claimed in claim 14, wherein said C-shaped portion forms an arc extending over an angular range between about 180° and 270°.

17. An electric cord holder, comprising:
a sheath made of an elongated plastic extrusion having a slotted-tubular cross-section so as to define a cord-receiving channel therein, said sheath having a dome-shaped front wall having two ends and a planar rear wall joined to one end of said front wall and extending from said one end of said front wall towards the other end of said front wall, said rear wall having a free end leaving a slot adapted for insertion of an electrical cord into said cord-receiving channel between said free end of said rear wall and said other end of said front wall, said rear wall having an inner face which partially defines said cord-receiving channel and an outer face, said dome-shaped front wall including two radially inwardly extending ribs spaced apart from one another so as to form a groove therebetween, whereby electrical cord may be nestled between said groove and said rear wall; and
securing means of predetermined width having a generally planar outer surface connected to said outer face of said rear wall and adapted to be attached to an external surface whereby said electric cord holder may be attached to said external surface.

18. The electric cord holder as claimed in claim 17, wherein said securing means comprises an adhesive strip and a protective cover normally covering said adhesive strip, but removable therefrom prior to attachment of said electric cord holder to said external surface.

19. The electric cord holder as claimed in claim 17, wherein said dome-shaped front wall is arcuate and forms an arc extending over an angular range between 180° and 270°.

* * * * *